United States Patent [19]
Haines et al.

[11] Patent Number: 5,972,817
[45] Date of Patent: *Oct. 26, 1999

[54] FOAMED GLASS ARTICLE FOR PREPARING SURFACES, USE THEREFOR, AND METHOD OF MAKING SAME

[75] Inventors: Steven C. Haines; Tai B. Bixby, both of Santa Fe, N.Mex.; Henry Oat, Atlanta, Ga.; Carl E. Frahme, Las Vegas, N.Mex.

[73] Assignee: Andrew Ungerleider, Santa Fe, N.Mex.

[*] Notice: This patent is subject to a terminal disclaimer.

[21] Appl. No.: 09/128,557

[22] Filed: Aug. 3, 1998

Related U.S. Application Data

[63] Continuation-in-part of application No. 08/766,552, Dec. 10, 1996, Pat. No. 5,821,184
[60] Provisional application No. 60/014,270, Mar. 29, 1996.

[51] Int. Cl.⁶ .......................... C03C 11/00; C04B 38/02; C04B 38/10; C03B 19/08
[52] U.S. Cl. ................. 501/39; 501/32; 501/84; 501/155; 65/22; 51/296; 51/307; 51/309; 510/109; 510/180; 510/238; 510/293; 510/240; 510/241; 510/243; 510/244; 510/245
[58] Field of Search .................. 501/39, 32, 84, 501/155, 11, 80, 85; 65/22; 51/296, 307, 309

[56] References Cited

U.S. PATENT DOCUMENTS

| | | | |
|---|---|---|---|
| 3,963,503 | 6/1976 | Mackenzie | 501/39 |
| 4,933,306 | 6/1990 | Pietsch | 501/39 |
| 4,981,820 | 1/1991 | Renlund et al. | 501/39 |
| 5,326,382 | 7/1994 | Oat | 501/39 |
| 5,821,184 | 10/1998 | Haines et al. | 501/39 |

*Primary Examiner*—Michael Marcheschi
*Attorney, Agent, or Firm*—Robert W. Becker & Associates

[57] ABSTRACT

A foamed glass article for preparing surfaces, the use therefor, and a method of making same are provided. The foamed glass article is in the form of a block, disk or similar product, and is used for preparing surfaces such as by sanding, rubbing and scraping the same to clean, abrade, polish, smooth, or the like such a surface. The foamed glass article is formed from a starting mixture that comprised glass, 0.10–20% by weight of at least one non-carbon/sulfate based foaming agent, and optionally an additional abrasive material. A mixture of powdered glass and non-carbon/sulfate based foaming agent can be placed in a mold and heated so that the mixture sinters and subsequently foams. Thereafter, the foamed mixture is annealed.

19 Claims, 1 Drawing Sheet

FOAMED GLASS ARTICLE FOR PREPARING SURFACES, USE THEREFOR, AND METHOD OF MAKING SAME

This application is a continuation-in-part of U.S. patent application Ser. No. 08/766,552, filed Dec. 10, 1996, U.S. Pat. No. 5,821,184 which was based on Provisional application No. 60/014,270, filed Mar. 29, 1996.

BACKGROUND OF THE INVENTION

The present invention relates to a foamed glass article, such as a block, disk or similar product, for preparing or treating hard surfaces, and also relates to the use of and a method of making such a product.

Surfaces of many different articles and materials have to be prepared either to make them immediately ready for use or to prepare them for subsequent treatment. Such surface preparation includes sanding, rubbing and scraping a surface to clean, abrade, polish, etc. such a surface. For example, painted surfaces, such as metal, wood, plastic, fiberglass, and the like frequently have to be repainted. Prior to being repainted, these surfaces have to be sanded or otherwise cleaned and smoothed so that a new coat of paint or other treatment can be applied to such a surface. Similarly, rough surfaces of various materials frequently need to be sanded or otherwise smoothed so that they can be painted and treated. Grills, griddles, barbecues, and the like frequently need to be degreased, cleaned and/or polished. Rust, stains and grease frequently have to be removed from pots and pans, glazed porcelain, ceramic or glass tiles, baked-on enameled metal fixtures, concrete, glass shower doors and the like.

Various products are known for preparing the aforementioned wide variety of surfaces. Such products, which are generally limited to specific applications, include sandpaper, pumice, chemicals, steel, woven and non-woven plastic pads, wire brushes, knurled metal files, and the like. None of the known products provide a universal product for all of the aforementioned surfaces, and all have their inherent drawbacks. For example, sandpaper tears easily and wears out fast. In addition, sandpaper produces fine air-borne dust and the abrasive surface of the sandpaper quickly becomes clogged, especially when sanding paint from a surface. In addition, sandpaper does not work well on metal, and can gouge or scratch an underlying surface. Furthermore, grit or granular material embedded in the sandpaper dulls, thus quickly reducing the effectiveness of the sandpaper. In addition, in order to obtain a smooth surface, sandpaper of increasingly finer grit must be used throughout the process. Finally, sandpaper will not conform to irregular, i.e. non-planar, surfaces, especially when the sandpaper is mounted on a flat block or a sanding machine. The use of pumice is environmentally unfriendly in that pumice must be strip mined and is a non-renewable resource. Furthermore, the quality of pumice is inconsistent and cannot be regulated, so that a uniform product cannot be guaranteed. In addition, pumice blocks are not suitable for sanding applications. Chemicals are inconvenient to use, are often toxic, and are ineffective on some deeply stained surfaces. In addition, the use of chemicals frequently requires further products and subsequent further treatment of a surface in order to prepare it. Also, some chemicals will not work underwater. Rigid metal files and the like, in addition to becoming clogged, will not conform to an irregular angled or rounded surface.

It is therefore an object of the present invention to provide an economical yet effective universal mechanical surface preparation product that is easy to produce and will overcome the aforementioned drawbacks.

In particular, it is a further object of the present invention to provide a superior surface preparation product, such as for sanding, smoothing, cleaning and polishing a surface, that comprises foamed glass. This glass can be of virgin glass, or can be made from a mixture, the main constituent of which is recycled waste glass, thus providing a very economical product that at the same time is a very environmentally friendly use for waste glass.

SUMMARY OF THE INVENTION

These and other objects and advantages of the present invention are realized by providing a surface preparing means in the form of a foamed glass article having any desired specific shape, with the foamed glass article being derived from a starting mixture that comprises glass and 0.10–20.0% by weight of at least one non-carbon/sulfate based foaming agent. Thus, the present invention provides for the use of a foamed glass article as a surface preparing means. The present invention also provides a method of making foamed glass as a surface preparing means, with such a method including the steps of providing powdered or ground glass, mixing at least one non-carbon/sulfate based foaming agent with the powdered glass to form a mixture, placing the mixture on a surface, such as a belt, plate, or in a mold, heating the mixture on the belt or in the mold so that the mixture sinters and subsequently foams, and annealing the foamed mixture by cooling the same to room temperature to form a foamed glass product.

The glass can be virgin glass or waste glass. The term "waste glass" as used in this application is intended to refer to any waste glass that is waste or scrap, either from a pre-consumer manufacturing operation, such as window plate manufacturing, glass bottle manufacturing, light bulb manufacturing, glass bead manufacturing, and the like, or post-consumer waste glass, such as bottles collected by a public or private recycling operation. Such recycled or otherwise recovered glass includes soda lime glass, borosilicate glass, alumino silicate glass, and recycled foamed glass as made pursuant to the instant application. The glass is used in powdered or otherwise pulverulent form and has an average particle size distribution that ranges from 1–500$\mu$. Although, as indicated, any glass can be used, to ensure consistency of the glass clean glass or even virgin glass is preferred.

Carbon/sulfate foamed glass or so-called blackfoamed glass has been known for some time. For example, U.S. Pat. No. 2,514,324, Ford, discloses the use of such cellulated glass as thermal insulation and as buoyant elements. Merely as a by-product, black foamed glass manufactured for insulation purposes has also been used for grill-cleaning applications. However, such black foamed glass is very unsatisfactory for surface preparation purposes due to the fact that the chemistry and cell structure of such black foamed glass is quite different from the chemistry and cell structure of non-sulfur based foamed waste or virgin glass, so-called white foamed glass. In particular, again referring to U.S. Pat. No. 2,514,324 for critical background information concerning black foamed glass, during the far more expensive production of this custom made specialty glass, a sulfur-containing compound, generally a sulfate, is added to a batch of virgin and not recycled glass, and a reagent in the form of finely divided carbon must also be provided to produce the sulfur based foaming gasses. Such black foamed glass comprises a closed cellular structure in which is enclosed sulfur dioxide and hydrogen sulfide gas. Thus, not only when the glass sheets are cut to size for use, but more particularly during use of the blocks themselves to clean grills, noxious sulfur dioxide and hydrogen sulfide gas is given off. This occurs because as the blocks of black foamed glass are used, the surface of the block wears away, thus continuously breaking down cells and allowing the enclosed noxious gas to escape. Furthermore, such black foamed glass blocks are rather brittle, wear away rather quickly, and disperse residue over a wide area, and are therefore unsuitable for most applications contemplated by the instant application.

The use of non-carbon/sulfate based foamed glass for various applications has also been proposed. For example, U.S. Pat. No. 2,955,049, Booth, provides for a cellulated glass in the production of thermal and sound absorbing insulation materials. U.S. Pat. No. 3,443,920, Overcashier, also provides for a foamed glass material as thermal insulation. Foamed glass utilizing used-container glass is proposed by U.S. Pat. No. 3,963,503, McKenzie, for the purpose of providing structural and decorative materials. Finally, U.S. Pat. No. 4,933,306, Pietsch, discloses the use of cellular glass bodies in the cloth distressing stonewashing industry to tear the fibers of cloth.

Applicants are unaware of any known disclosure or suggestion for the use of foamed waste or virgin glass, so-called white foamed glass, as a surface preparation means that works as does the product of the instant application, namely to remove a coating, dirt or stain from a surface, or to make a surface smooth or otherwise prepare it for further treatment.

Although the starting mixture is intended to cover a range of powdered or ground glass and 0.10–20% by weight of foaming agent, it is presently contemplated that a preferred range will be 0.5–5.0% by weight of foaming agent. In addition, pursuant to a preferred heating step, the mixture of powdered glass and foaming agent is first heated to a sintering temperature and subsequently the temperature is increased to effect foaming. For example, the mixture can first be heated to a temperature of about 1250° F., with this temperature being maintained for a given period of time, such as for one hour; the temperature is then increased to a range of 1274–1700° F. to effect foaming. Annealing of the foamed mixture can either comprise a gradual cooling to room temperature, or, pursuant to a preferred embodiment, can comprise the steps of first rapidly cooling the foamed mixture to a temperature below a foaming temperature, and then slowly cooling the foamed mixture to room temperature. Any glassy skin or crust that is formed on the resulting product can be removed, at least from abrasive surfaces, such as by cutting or planing using any suitable means.

The starting mixture of powdered glass and foaming agent can comprise 69.9–99.9% by weight glass and 0.10–20% by weight foaming agent including mixtures of two or more foaming agents; in addition, 0–30.0% by weight of additional abrasive material can be added to the mixture prior to placing such a mixture in a mold. It should be noted that although the mixture can be placed on a belt or plate, it is presently preferred to use molds. A single larger mold or a plurality of smaller discrete molds can be provided. The smaller molds can actually have a geometry that is substantially the same as the desired final geometry of the foamed glass articles. If a larger mold is used, the product produced can be cut to the desired size and shape. In addition, the mixture can be placed in the mold or molds by placing one or more mounds thereof in the mold or molds, possibly forming one or more rows of such mounds.

Although calcium carbonate appears to be a particularly expedient foaming agent, a large variety of non-carbon/sulfate based foaming agents can be used. Examples of such foaming agents include magnesium carbonate, sodium carbonate, strontium carbonate, lithium carbonate, barium carbonate, sugar, urea, water, and mixtures thereof. The additional abrasive material that can optionally be added to the mixture to vary the abrasive quality of the final foamed glass article can be selected from a wide variety of common abrasive grit materials, such as, but not limited to, sand, aluminum oxide, silicon carbide, garnet, and mixtures thereof.

BRIEF DESCRIPTION OF THE DRAWING

The present invention is described in greater detail subsequently, as well as with the aid of Examples and the accompanying schematic drawing, i.e., FIG. 1, which illustrates one exemplary embodiment of a large mold in which rows of mounds of starting mixture are placed.

DESCRIPTION OF THE PREFERRED EMBODIMENTS

Figure 1:
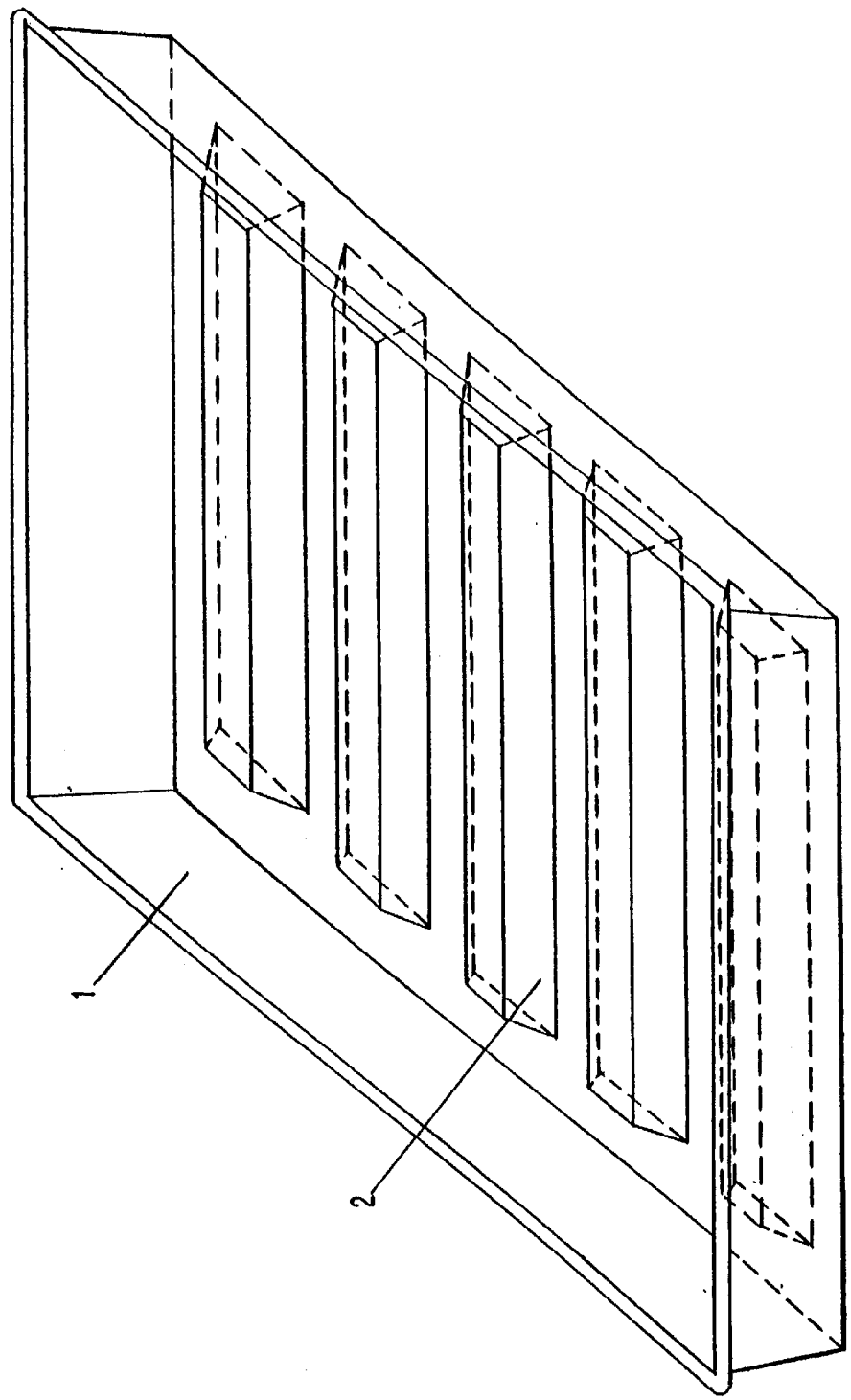

Applicants have discovered that foamed glass made with at least one non-carbon/sulfate based foaming agent provides a universal product for the mechanical preparation of surfaces of a great variety of materials, including wood, metal, porcelain, tiles, concrete, plastic, glass, fiberglass, and the like.

The foamed glass article of the present invention is primarily used in block or disk form. Although such blocks can have any desired and convenient shape, the blocks themselves will have a specific geometry. The inventive foamed glass article can be used for cleaning grills and griddles, can be used for cleaning tiles, porcelain and enameled surfaces, can be used as a sanding disk or block, such as for removing paint or other surface treatments, can be used to clean cement, can be used to clean metal, including removing rust therefrom, and for any other similar cleaning or polishing application. Furthermore, the inventive foamed glass surface preparing product can be used either manually, with or without a handle, or as an attachment to, for example, a vibrating or rotating machine.

Foamed glass articles made from glass and at least one non-carbon/sulfate based foaming agent, as taught by the instant application, and used as a surface preparing means, have distinct advantages over the heretofore known surface preparation products. The inventive foamed or cellulated glass surface preparing means is unique in that its surface inherently wears down in such a way as to fully conform to curved, non-planar, or otherwise irregularly shaped objects during a cleaning or sanding process. Furthermore, the inventive foamed glass product wears away in such a way that its surface does not become clogged with debris from the material that is being cleaned or sanded, and rather than becoming dull, the inventive foamed glass product remains continually sharp and abrasive. Furthermore, the inventive foamed glass product has a uniform and regulatable consistency, and one and the same foamed glass block can be used to bring a rough surface to a smooth condition. The inventive product will clean and polish enameled metal and glazed porcelain surfaces without scratching or staining the same, and can furthermore be used on wet surfaces without disintegration or a loss of efficiency. The inventive foamed glass product has a controllably variable content to thereby be able to provide for a wide range of hardness, abrasiveness, strength, density, and cell or pore size in order to meet market demands.

In addition, the inventive foamed glass product is non-toxic, longer lasting, and does not generate fine air-borne dust as do other abrasives such as sandpaper. The inventive foamed glass product will work wet or under water without any loss of performance. The inventive foamed glass product has a far different cellular structure than does so called black foamed glass, which is made with a carbon/sulfate-based foaming agent. In particular, in contrast to the closed and regular cellular structure of black foamed glass, which encloses noxious gas, the inventive foamed glass is first of all formed, for example, by expanding and escaping carbon dioxide gas, rather than sulfur dioxide and/or hydrogen sulfide gas. Furthermore, the cell structure of the inventive foamed glass is open, interconnected, and irregular, allowing ambient atmospheric gasses to penetrate the cells.

A distinct and surprising advantage of the inventive foamed glass is the fact that it is an extremely economical product. This is particularly surprising and unexpected due to the experience in the past with black foamed glass, which is very expensive to produce. The present invention provides for the use of a far less expensive glass, especially when waste glass is used, which at the same time has a significant positive environmental impact, especially since the market for waste glass is very limited, being almost nonexistent for mixed color waste glass; thus, presently a large percentage of waste glass ends up in landfills.

Prior to providing specific examples, the following is a more general discussion concerning production of the inventive foamed glass product. As indicated previously, powdered virgin glass or recycled waste glass is mixed with finely ground non-carbon/sulfate based foaming agent typically in the average range of about 80 to minus (i.e. any particles smaller than this will pass through) 325 mesh. Additional abrasive or refractory material can also be added to the starting mixture to vary or enhance the abrasive characteristic of the final product. The resulting dry mixture can be placed into a mold, such as the mold 1 of FIG. 1. The mixture is expediently placed into the mold 1 in the form of several rows 2 of the mixture. These mounds or piles of mixture typically have a natural angle of repose of about 15 to 50 degrees. Even greater angles to the horizontal can be achieved by compressing the dry mixture. Depositing the mixture into shaped mounds, with or without compacting, and in the form of discrete piles or rows, helps to eliminate the folds and voids that typically appear when mixtures of this type are foamed as flattened beds of powder.

The mold 1 can be made of steel, ceramic, or ceramic fiber, and is expediently in the shape of a frustum in order to facilitate easy release of the final foamed glass product. In addition, the inside surfaces of the mold can be coated with a soft refractory release agent to further facilitate separation of the foam glass product from the mold.

One or more molds with the mixture therein is placed into a furnace for either a batch or continuous foaming process. The mixture is then heated in order to sinter and foam the mixture and thereby produce the foamed glass product having a desired density, pore size and hardness. As the powdered mixture is heated to above the softening point of glass, approximately 1050° F., the mixture begins to sinter. The division of the powdered mixture into rows or mounds allows the glass to absorb heat more rapidly and to therefore foam faster by reducing the ability of the foaming glass to insulate itself. At approximately 1058° F. the calcium carbonate, if calcium carbonate has been used as the foaming agent, begins to react with some of the silicon dioxide in the glass to produce carbon dioxide gas. Carbon dioxide is also formed by any remaining calcium carbonate once the mixture reaches 1274° F., above which calcium carbonate breaks down into calcium oxide and carbon dioxide gas. The carbon dioxide is primarily responsible for the formation of cells and pores in the softened glass mass as the carbon dioxide expands. The mixture in the mold is held for a period of time at a peak foaming temperature of, for example, between 1274–1700° F., or even higher, depending on the properties that are desired. By adjusting the process temperatures and times, the density and hardness as well as other properties can be closely controlled.

As the furnace reaches foaming temperatures, each mass of foaming glass, originating from one of the discrete rows or mounds, foams until it comes into contact and fuses with its neighbors. The fused mass of foaming glass then expands to conform to the shape of the walls of the mold, filling all of the corners. The shapes and sizes of the initial mounds of mixture are very important and are determined with the anticipation that the foaming mixture exactly fill the mold. After the glass is foamed to the desired density and pore structure, the temperature of the furnace is rapidly reduced to halt foaming of the glass. When the exterior of the foamed glass in the mold has rigidified sufficiently, the mass of foamed glass cooled in the mold or can be removed from the mold and placed into a lehr for annealing. The temperature of the lehr is slowly lowered from the softening temperature of the glass to ambient temperature to anneal the block of foamed glass. Once cooled, any skin or crust can be cut off of the foamed glass product, and the product can be cut into a variety of desired shapes.

The following examples illustrate the wide variety of compositions and applications for the inventive foamed glass articles.

EXAMPLE 1

To produce a grill cleaning block having embedded abrasive material therein, 13.68 g (2.4%) calcium carbonate, minus 200 mesh, 442.32 g (77.6%) recycled float glass ground to minus 140 mesh, and 114 g (20%) sand, 60 to 100 mesh, were mixed thoroughly together. The resulting mixture was placed into a stainless steel mold having inside dimensions of 4 ¼ inches×4 inches×8 ¼ inches. The mold was covered with a ½ inch stainless steel plate. The mold with the mixture therein was fired to 1250° F. to sinter for 60 minutes. The temperature was then raised to 1450° F. to foam for 30 minutes. The foamed glass in the mold was annealed by cooling slowly to room temperature over 120 minutes. The cooled block of foamed glass was removed from the mold, and the outer layer of crust was removed with a band saw to expose the abrasive cells. The resulting block had a density of 13.9 pounds per cubic foot and a pore size distribution ranging from about 0.5 to 2 mm. The resulting block had final dimensions of 4 inches×3.75 inches×8 inches (it is contemplated that grill cleaning blocks would range in size from 1 ½ inches×3 ¾ inches×4 inches to 2 ½ inches×3 ½ inches×6 inches to 4 inches×4 inches×8 inches). The resulting block had no odor, was white to light gray in color, and had open, interconnected cells.

EXAMPLE 2

A further grill cleaning block having no sand or embedded abrasives was formed by a procedure similar to that of Example 1 using 17.1 g (3%) calcium carbonate, minus 200 mesh, and 552.9 g (97%) recycled container glass, minus 325 mesh. The foaming temperature was 1400° F. for 45 minutes. The resulting density was 7.2 pounds per cubic foot, with the resulting material having a pore size distribution ranging from about 1 to 3 mm.

EXAMPLE 3

To prepare a block for cleaning tile, porcelain or enameled surfaces, glass, and glass or ceramic tile a procedure similar to that of Example 1 was used by mixing together 564.3 g (98.5%) recycled container glass, minus 325 mesh, and 5.7 g (1.5%) calcium carbonate, minus 200 mesh. The foaming temperature was 1360° F. for 60 minutes. The resulting density was 17.6 pounds per cubic foot, with a pore size distribution ranging from about 0.05 to 0.2 mm. The resulting block was pure white in color due to the use of clear container glass. The resulting block was cut into smaller blocks of a size suitable for cleaning tile, porcelain, etc., and had final dimensions of 2 inches×2 inches×4 inches (in this case, it is contemplated that such blocks can range in size from 1 inch×1 ½ inches×6 inches to 2 inches×2 ½ inches×4 inches to 3 inches×4 inches×1 ½ inches). The cut blocks can be mounted onto a handle by fixing the handle into a hole drilled into each block.

EXAMPLE 4

Another cleaner block for use on tile, porcelain, or enameled surfaces was prepared in a procedure similar to that of Example 1 by mixing together 569.4 g (99.9%) recycled container glass, minus 325 mesh, and 0.6 g (0.1%) calcium carbonate, minus 325 mesh. The foaming temperature was 1425° F. for 25 minutes. The density of the resulting material was 15.3 pounds per cubic foot, with a pore size distribution ranging from about 0.01 to 0.1 mm. Again, the resulting block can be cut into smaller blocks.

EXAMPLE 4A

To produce a further cleaner block for use on tile, porcelain, glass, or enameled surfaces, 44 g (2%) calcium carbonate minus 200 mesh, 5.5 g (0.025%) sodium carbonate minus 200 mesh, 5.5 g (0.025%) magnesium carbonate minus 200 mesh, 2.15 kg (97.95%) recycled float glass minus 200 mesh were mixed thoroughly together. The resulting mixture was placed onto a ceramic mold having inside dimensions of 18 inches×10½ inches×6 inches. The mold was covered with a ceramic lid ⅝ inches thick. The temperature was then raised to 1250° F. to sinter for 75 minutes, the temperature was then raised to 1320° F. to foam for 40 minutes. The foamed glass in the mold was annealed by cooling slowly to room temperature over 120 minutes. The resulting block had a thickness of 3 inches. The cooled block of foamed glass was removed from the mold, and the outer layer of crust was removed with a band saw to expose the abrasive cells. The resulting block had a density of 14.9 pounds per cubic foot and a pore size ranging from about 0.5 to 1.5 mm. The resulting cut block had final dimensions of 2 inches×2 inches×4 inches (it is contemplated that such blocks can range in size from 1 inch×1½ inches×6 inches to 2 inches×2½ inches×4 inches to 2 inches×3 inches×4 inches). The cut blocks can be mounted onto a handle by fixing the handle into a hole drilled into each block.

EXAMPLE 5

A hand held fine pore surface preparation block was produced in a procedure similar to that of Example 1 by mixing together 564.3 g (99%) recycled container glass, minus 60 mesh and 5.7 g (1%) calcium carbonate, minus 200 mesh. The foaming temperature was 1500° F. for 20 minutes. The resulting material had a density of 24.3 pounds per cubic foot and a pore size distribution ranging from about 0.1 to 0.5 mm. The resulting block can be cut into convenient-to-hold blocks having final dimensions of 4 inches×3.75 inches×2 inches (it is contemplated that such blocks could have a size ranging from 4 inches×4½ inches× 1½ inches to 2½ inches×3½ inches×6 inches to 3 inches×2 inches×8 inches). The color of the resulting block was pale yellow to tan due to the use of amber container glass (it should be noted that any container glass or plate glass would be suitable for this purpose).

EXAMPLE 6

Another hand held fine pore surface preparation block was produced in a procedure similar to that of Example 1 by mixing together 552.9 g (97%) recycled float glass, minus 140 mesh, and 17.1 g (3%) calcium carbonate, minus 200 mesh. The foaming temperature was 1360° F. for 60 minutes. The resulting material had a density of 19.8 pounds per cubic foot, and a pore size distribution ranging from about 0.05 to 0.2 mm. Again, the resulting block can be cut into convenient-to-hold blocks.

EXAMPLE 7

A further hand held but this time medium pore surface preparation block was produced in a procedure similar to that of Example 1 by mixing together 552.9 g (97%) recycled float glass, minus 200 mesh, and 17.1 g (3%) calcium carbonate, minus 200 mesh. The foaming temperature was 1500° for 20 minutes. The resulting material had a density of 11.2 pounds per cubic foot, and a pore size distribution ranging from about 0.5 to 1.5 mm. The resulting block was cut into convenient-to-hold blocks having final dimensions of 4 inches×3.75 inches×2 inches.

EXAMPLE 8

Another hand held medium pore surface preparation block was produced by mixing together 535.8 g (94%) recycled float glass, minus 140 mesh, and 34.2 g (6%) calcium carbonate, minus 200 mesh. The foaming temperature was 1500° F. for 20 minutes. The resulting material had a density of 15.6 pounds per cubic foot, and a pore size distribution ranging from about 0.5 to 1.0 mm. Again, the resulting block was cut into convenient-to-hold blocks.

EXAMPLE 9

Another hand held but this time coarse pore surface preparation block was prepared in a procedure similar to that of Example 1 by mixing together 13.68 g (2.4%) calcium carbonate, minus 200 mesh, 442.32 (77.6%) recycled container glass ground to minus 60 mesh, and 114 g (20%) sand, 60 to 100 mesh. The foaming temperature was 1500° F. for 20 minutes. The resulting material had a density of 27.8 pounds per cubic foot, and a pore size distribution ranging from about 1 to 3 mm. The resulting block was again cut into blocks of a size convenient to hold by hand. The resulting block was pale yellow to tan in color due to the use of amber container glass.

EXAMPLE 10

Another hand held coarse pore surface preparation block was produced in a procedure similar to that of Example 1 by mixing together 57.0 g (10%) calcium carbonate, minus 200 mesh, and 513 (90%) recycled container glass ground to minus 325 mesh. The foaming temperature was 1600° F. for 15 minutes. The resulting material had a density of 17.2 pounds per cubic foot, and a pore size distribution ranging from about 2 to 4 mm. The resulting block was again cut into blocks of a size convenient to hold by hand.

EXAMPLE 11

In order to produce a random orbital sander disk, 15.81 kg (93%) of minus 140 mesh recycled float glass was mixed together with 1.19 kg (7%) of minus 200 mesh calcium carbonate. The mixture was placed in a mold having dimensions of 22 inches×46 inches×5 inches and the mold was covered with a stainless steel lid. The mold and mixture were sintered at 1250° F. for 60 minutes, whereupon the temperature was raised to foam at 1500° F. for 40 minutes. The temperature was lowered slowly to room temperature over 360 minutes. The resulting mass of foamed glass had dimensions of 22 inches×46 inches×6 inches (the extra inch was due to the lifting of the lid by the expanding foam). The resulting material had a density of 19.5 pounds per cubic foot, and a pore size distribution ranging from about 1 to 2.4 mm. The resulting mass of foamed glass could be cut into multiple blocks, which are then cut into multiple cylindrical shapes having 5 inch diameters, which are then sliced into disks 2 inches thick; the cuts were made with a band saw. It is contemplated that random orbital sander disks could range in size from 4–6 inches in diameter to 1 to 2 inches thick. Such disks can be coated on one side with an adhesive compound and the loop part of a hook-and-loop fabric system could then be applied thereto. The resulting disk can be easily mounted onto common orbital sanding power tools fitted with heads having the hook part of the hook-and-loop fabric system.

EXAMPLE 12

Another random orbital sander disk was produced in a procedure similar to that of Example 11 by mixing together 16.32 kg (96%) of minus 325 mesh recycled container glass and 0.68 kg (4%) of minus 200 mesh calcium carbonate. The foaming temperature was 1450° F. for 60 minutes. The resulting material had a density of 14.8 pounds per cubic foot and a pore size distribution ranging from about 0.5 to 1.5 mm. The resulting mass of foamed glass was again cut into two inch thick disks having a 5 inch diameter.

EXAMPLE 13

A vibratory "palm sander" abrasive block was formed by a procedure similar to that of Example 11 by mixing together 16.49 kg (97%) of minus 140 mesh float glass and 0.51 kg (3%) of minus 200 mesh calcium carbonate. The foaming temperature was 1500° F. for 40 minutes. The resulting foamed glass material had a density of 11.9 pounds per cubic foot and a pore size distribution of about 1.2 to 2.8 mm. The resulting mass of foamed glass was cut into multiple blocks, which are then cut into blocks having dimensions of 4 inches4 inches2.5 inches (it is contemplated that vibratory sander blocks could range in size from 1½ inches×4¼ inches×4½ inches to 2 inches×3¾ inches×7¼ inches). These blocks are also coated on one side with an adhesive compound to which is applied the loop part of a hook-andloop fabric system. The resulting blocks can be easily mounted onto common vibratory sanding power tools fitted with 4 inch×4 inch heads on which is disposed the hook part of the hook-and-loop fabric system.

EXAMPLE 14

Another vibratory "palm sander" abrasive block was produced in a procedure similar to that of Example 11 by mixing together 16.49 kg (97%) of minus 60 mesh recycled container glass and 0.51 kg (3%) of minus 200 mesh calcium carbonate. The foaming temperature was 1500° F. for 40 minutes. The resulting material was similar to that of Example 13 except that it had a density of 18.3 pounds per cubic foot and a pore size distribution ranging from about 2 to 4 mm. Blocks were prepared in a manner similar to that described in Example 13, with the blocks having a pale yellow to tan color due to the use of amber container glass.

EXAMPLE 15

To produce a cement cleaner block, a procedure similar to that of Example 1 was utilized by thoroughly mixing together 541.5 g (95%) recycled float glass, minus 200 mesh, and 28.5 g (5%) of calcium carbonate, minus 200 mesh. The foaming temperature was 1400° F. for 45 minutes. The resulting material had a density of 16.6 pounds per cubic foot, and a pore size distribution ranging from about 0.05 to 0.2 mm. The resulting block was cut into smaller blocks of a size suitable for cleaning or degreasing cement, etc., and had final dimensions of 4 inches×4 inches×3 inches (it is contemplated that cement cleaner blocks can range in size from 3½ inches×4 inches×3 inches to 4 inches4 inches× 1½ inches to 4 inches×4 inches×8 inches).

EXAMPLE 16

Another cement cleaner block was produced in a procedure similar to that of Example 1 by mixing together 552.9 g (97%) recycled container glass, minus 325 mesh, and 17.1 g (3%) of magneisum carbonate, minus 200 mesh. The foaming temperature was 1400° F. for 45 minutes. The resulting material had a density of 28.6 pounds per cubic foot, and a pore size distribution ranging from 0.01 to 0.2 mm. The resulting block was again cut into smaller blocks of 4 inches×4 inches×3 inches.

EXAMPLE 17

A rust remover block was produced by a procedure similar to that of Example 1 by mixing together 456 g (80%) recycled container glass, minus 325 mesh, and 114 g (20%) of calcium carbonate, minus 325 mesh. The foaming temperature was 1700° F. for 15 minutes. The resulting material had a density of 42.6 pounds per cubic foot and a pore size distribution ranging from about 0.01 to 0.1 mm.

EXAMPLE 18

This Example provides some additional detail concerning the expedient mounding of the foamable mixture.

To produce a block of foamed glass material suitable for use as a sanding block, 12 kg of a foamable glass mixture was prepared by thoroughly mixing together for 20 minutes in a mechanical mixer 2.4% by weight calcium carbonate powder (100% of which passes through a 200 mesh screen), 77.6% by weight recycled or virgin glass (100% of which passes through a 325 mesh screen), and 20% by weight common sand (100% of which passes through a 40 mesh screen but which does not pass through an 80 mesh screen). A ¼ inch stainless steel plate having a dimension of 20 inches×26 inches was coated with a thin slurry of talc and alumina as agents to prevent sticking. A stainless steel mold was coated with the same slurry. The mold had the shape of a frustum and was open at the base. The base dimensions were 20 inches×26 inches, and the peak dimensions were 19 inches×26 inches; the mold was 6 inches deep. The foamable mixture was divided into four equal portions of 3 kg each, and each portion was placed on the 20 inch×26 inch plate in a row such that it had base dimensions of 4.5 inches×16 inches. The four rows were evenly spaced 2 inches apart. The rows, which ran parallel to the 26 inches dimension of the plate, were spaced 1 inch away from the edge of the plate. The ends of the rows were placed 2 inches away from the edges of the plate having the 20 inch dimensions. Each row had a trapezoidal cross-section the base of which was 4.5 inches and the top of which was 3.5 inches, with a height of 3 inches. Each portion was compacted into the above shape, and the bulk density of the powder after being compacted was 72 pounds per cubic foot. The frustum shaped lid was lowered onto the plate that supported the mounds of foamable mixture, whereupon the entire assembly was placed into a furnace. The furnace was rapidly heated to 1250° F. and was held there for one hour to allow the foamable mixture to sinter and absorb heat evenly. The temperature was then increased to 1500° F. and held there for 60 minutes. The mounds of powder foamed, fused, and filled the mold during this process. The temperature was then rapidly lowered to 1050° F. and was held there for 15 minutes to halt the foaming process and to solidify the outside skin of the mass of foamed glass. The frustum shaped portion of the mold was then removed from the mass of solidified foamed glass. The block of foamed glass was then placed in an annealing lehr, which slowly cooled the foamed glass from 1050° F. to ambient temperature. The finished and cooled block of foamed glass was then planed and trimmed to remove the glassy skin and traces of release agent. The finished cut block of foamed glass had dimensions of 18 inches×24 inches×4 inches, a density of 19.3 pounds per cubic foot, and a pore size distribution ranging from about 2.0 to 5.0 mm. The finished block of foamed glass could then be cut into a variety of regular shapes for use in surface preparation.

The present invention is, of course, in no way restricted to the specific disclosure of the specification, drawings and examples, but also encompasses any modifications within the scope of the appended claims.

What we claim is:

1. A method of treating a hard surface to remove material therefrom, comprising the steps of:
   providing a foamed glass article formed from a starting mixture that comprises glass and 0.10–20% by weight of at least one non-carbon/sulfate based foaming agent; and
   contacting said surface with said foamed glass article and providing relative movement between said article and said surface.

2. A method according to claim 1, wherein the hard surface is treated by sanding, rubbing, scraping, degreasing, polishing, cleaning or smoothing.

3. A method according to claim 2, wherein the hard surface comprises wood, metal, plastic, fiberglass, porcelain, glass, enameled surfaces, concrete, or tiles.

4. A method according to claim 1, wherein said starting mixture further comprises up to 30.0% by weight abrasive material selected from the group consisting of sand, aluminum oxide, silicon carbide, garnet, tripoli, ground ceramic, and mixtures thereof.

5. A method according to claim 4, wherein said starting mixture comprises 69.9–99.9% by weight virgin glass or waste glass, 0.10–20% of at least one foaming agent selected from the group consisting of calcium carbonate, magnesium carbonate, sodium carbonate, strontium carbonate, lithium carbonate, barium carbonate, sugar, urea, water and mixtures thereof, and up to 30.0% by weight abrasive material selected from the group consisting of sand, aluminum oxide, silicon carbide, garnet, tripoli, ground ceramic, and mixtures thereof.

6. A method according to claim 5, wherein said starting mixture comprises powdered glass and 0.5–5.0% by weight of said foaming agent.

7. A method according to claim 1, wherein said foamed glass article has a shape of a block or disk.

8. A method of making foamed glass as a means to treat a hard surface to remove material therefrom, said method comprising the steps of:

providing powdered glass;
mixing at least one non-carbon/sulfate based foaming agent with said powdered glass to form a mixture;
placing said mixture onto a surface;
heating said mixture so that said mixture sinters and subsequently foams to form a foamed mixture; and
annealing said foamed mixture by cooling it to room temperature to form a foamed glass product, wherein said heating step comprises first heating said mixture to a temperature of about 1250° F., maintaining this temperature for a sufficient period of time to allow said mixture to sinter and absorb heat evenly, and then increasing said temperature to 1274–1700° F.

9. A method according to claim 8, wherein said mixing step comprises mixing 0.10–20% by weight of said foaming agent with said powdered glass.

10. A method according to claim 9, wherein said mixing step comprises mixing 0.5–5.0% by weight of said foaming agent with said powdered glass.

11. A method according to claim 8, wherein said placing step comprises placing said mixture onto a continuous belt, onto a plate, or into at least one mold.

12. A method according to claim 8, wherein said annealing step comprises the steps of first rapidly cooling said foamed mixture to a temperature below a foaming temperature, and then slowly cooling said foamed mixture to room temperature.

13. A method according to claim 8, wherein said providing step comprises providing 69.9–99.9% by weight virgin glass or waste glass, said mixing step comprising mixing 0.10–20% by weight of at least one foaming agent, and which includes the further step of adding up to 30.0% by weight of abrasive material to said mixture prior to said placing step.

14. A method according to claim 13, wherein said at least one foaming agent is selected from the group consisting of calcium carbonate, magnesium carbonate, sodium carbonate, strontium carbonate, lithium carbonate, barium carbonate, sugar, urea, water, and mixtures thereof, and said abrasive material is selected from the group consisting of sand, aluminum oxide, silicon carbide, garnet, tripoli, ground ceramic, and mixtures thereof.

15. A method according to claim 8, which includes the additional steps, after said annealing step, of removing any glassy skin that is formed on said product, and cutting said foamed glass product into articles.

16. A surface treating article comprising a foamed glass, said foamed glass is formed from a starting mixture that comprises glass and 0.10–20% by weight of at least one non-carbon/sulfate based foaming agent, wherein the surface to be treated comprises wood, metal, plastic, fiberglass, porcelain, glass, enameled surfaces, concrete or tiles.

17. An article according to claim 16, wherein said starting mixture comprises 69.9–99.9% by weight virgin or waste glass, 0.10–20% non-carbon/sulfate based foaming agent, and up to 30.0% by weight of abrasive material.

18. An article according to claim 17, wherein said at least one foaming agent is selected from the group consisting of calcium carbonate, magnesium carbonate, sodium carbonate, strontium carbonate, lithium carbonate, barium carbonate, sugar, urea, water and mixtures thereof, and said abrasive material is selected from the group consisting of sand, aluminum oxide, silicon carbide, garnet, tripoli, ground ceramic, and mixtures thereof.

19. An article according to claim 17, wherein said foamed glass article has a shape of a block or disk.

* * * * *